United States Patent
Zirphile et al.

(10) Patent No.: US 10,555,289 B2
(45) Date of Patent: Feb. 4, 2020

(54) METHODS FOR TRANSMITTING DATA BETWEEN A TERMINAL AND A FREQUENCY-SYNCHRONIZED ACCESS NETWORK ON AN UPLINK MESSAGE FROM SAID TERMINAL

(71) Applicant: SIGFOX, Labege (FR)

(72) Inventors: Lionel Zirphile, Ramonville Saint Agne (FR); Nicolas Chalbos, Eaunes (FR); Christophe Fourtet, Pompignan (FR)

(73) Assignee: SIGFOX, Labege (FR)

( * ) Notice: Subject to any disclaimer, the term of this patent is extended or adjusted under 35 U.S.C. 154(b) by 97 days.

(21) Appl. No.: 15/552,789

(22) PCT Filed: Feb. 25, 2016

(86) PCT No.: PCT/FR2016/050441
§ 371 (c)(1),
(2) Date: Aug. 22, 2017

(87) PCT Pub. No.: WO2016/139408
PCT Pub. Date: Sep. 9, 2016

(65) Prior Publication Data
US 2018/0054815 A1    Feb. 22, 2018

(30) Foreign Application Priority Data
Mar. 3, 2015  (FR) .................................. 15 51783

(51) Int. Cl.
*H04W 72/04* (2009.01)
*H04W 56/00* (2009.01)
(Continued)

(52) U.S. Cl.
CPC ..... *H04W 72/0413* (2013.01); *H04W 56/001* (2013.01); *H04W 88/02* (2013.01); *H04W 88/08* (2013.01)

(58) Field of Classification Search
CPC ............ H04W 72/0413; H04W 72/04; H04W 72/1268; H04W 72/042; H04W 72/005;
(Continued)

(56) References Cited

U.S. PATENT DOCUMENTS 6,130,914 A   10/2000  Smithers
8,929,194 B2 * 1/2015  Han ..................... H04L 5/023
                                                    370/204

(Continued)

FOREIGN PATENT DOCUMENTS

EP    2 790 334 A1   10/2014

*Primary Examiner* — Un C Cho
*Assistant Examiner* — Rasha K Fayed
(74) *Attorney, Agent, or Firm* — Im IP Law; Chai Im; C. Andrew Im

(57) ABSTRACT

A method for transmitting, by a terminal of a wireless communication system, uplink messages on an uplink to an access network. A sequence of $N_R$ uplink messages is formed. Each uplink message of the sequence includes a same useful data packet and control data having an identifier for identifying the uplink message from the $N_R$ uplink messages of the sequence. The uplink messages of the sequence are transmitted on different respective center frequencies. Also, a method for transmitting, by the access network, a downlink message in response to the sequence of uplink messages, on a center frequency determined from the measured center frequencies of the uplink messages of the sequence.

11 Claims, 1 Drawing Sheet

(51) Int. Cl.
*H04W 88/02* (2009.01)
*H04W 88/08* (2009.01)

(58) Field of Classification Search
CPC ............... H04W 72/00; H04W 56/001; H04W 56/0035; H04W 56/00; H04W 56/0005; H04W 56/0015; H04W 88/08; H04W 88/02; H04W 74/0833; H04W 74/08; H04W 16/14; H04W 52/365; H04W 24/10; H04W 64/00; H04W 76/15; H04W 76/27; H04W 48/10; H04W 48/16; H04W 48/08; H04W 4/70; H04W 4/06; H04W 4/00; H04W 4/08; H04L 1/1861; H04L 1/1685; H04L 1/1812; H04L 1/1896; H04L 5/0051; H04L 5/0053; H04L 5/00; H04L 5/003; H04L 5/0007; H04L 5/0094
USPC ............... 370/329, 330, 312; 455/114.3, 425
See application file for complete search history.

(56) References Cited

U.S. PATENT DOCUMENTS

| | | | | |
|---|---|---|---|---|
| 2002/0021745 | A1* | 2/2002 | Negus | H04B 1/713 |
| | | | | 375/132 |
| 2007/0230394 | A1* | 10/2007 | Wang | H04J 11/0069 |
| | | | | 370/328 |
| 2010/0054283 | A1* | 3/2010 | Jin | H04J 3/0664 |
| | | | | 370/503 |
| 2015/0181546 | A1* | 6/2015 | Freda | H04W 56/0015 |
| | | | | 370/336 |
| 2016/0050657 | A1* | 2/2016 | Kishiyama | H04L 5/0053 |
| | | | | 370/329 |

* cited by examiner

METHODS FOR TRANSMITTING DATA BETWEEN A TERMINAL AND A FREQUENCY-SYNCHRONIZED ACCESS NETWORK ON AN UPLINK MESSAGE FROM SAID TERMINAL

RELATED APPLICATIONS

This application is a § 371 application from PCT/FR2016/050441 filed Feb. 25, 2016, which claims priority from French Patent Application No. 15 51783 filed Mar. 3, 2015, each of which is incorporated herein by reference in its entirety.

TECHNICAL FIELD

The present invention belongs to the field of digital telecommunications, and relates more particularly to methods for transmitting data between terminals and an access network of a wireless communication system.

BACKGROUND OF THE INVENTION

The present invention finds a particularly advantageous but in no way limiting application in ultra-narrowband wireless communication systems. "Ultra-narrowband" (or UNB in the literature) is understood to mean that the instantaneous frequency spectrum of the radio signals transmitted by the terminals has a frequency width of less than one kilohertz.

Such UNB wireless communication systems are particularly suitable for M2M ("Machine-to-Machine") or Internet of Things (or IoT in the literature) applications.

In such a UNB wireless communication system, data exchanges are essentially unidirectional, specifically on an uplink between terminals and an access network of said system.

The terminals transmit uplink messages that are collected by base stations of the access network, without having to associate themselves with one or more base stations of the access network beforehand. In other words, the uplink messages transmitted by a terminal are not intended for a specific base station of the access network, and the terminal transmits its uplink messages assuming that they will be able to be received by at least one base station. Such provisions are advantageous in that the terminal does not need to carry out regular measurements, which are intensive in particular from a power consumption point of view, in order to determine the most appropriate base station for receiving its uplink messages. The complexity hinges on the access network, which must be capable of receiving uplink messages that are able to be transmitted at arbitrary points in time, and on arbitrary center frequencies within a multiplexing frequency band of the various terminals.

Such a mode of operation, in which the data exchanges are essentially unidirectional, is entirely satisfactory for numerous applications, such as for example the remote reading of gas, water and electricity meters, the remote monitoring of buildings or houses, etc.

In some applications, however, it may be advantageous also to be able to perform data exchanges in the other direction, namely on a downlink from the access network to the terminals, for example in order to reconfigure a terminal and/or control an actuator linked to said terminal. However, it is necessary to offer such a capability while limiting the complexity of the terminals.

U.S. Pat. No. 6,130,914 describes an example of a bidirectional UNB wireless communication system making it possible to limit the complexity of the terminals. Specifically, in U.S. Pat. No. 6,130,914, the center frequency on which the access network transmits a downlink message to a terminal, in response to an uplink message transmitted by said terminal, is determined by said access network on the basis of the center frequency on which said uplink message has been received.

The precision in the generation of the center frequency of the uplink message, on the terminal side, may thus be poor and achieved using inexpensive frequency synthesizing means. Specifically, the access network does not know a priori on which center frequency the uplink message is transmitted, and by default has to listen to the uplink over the entire multiplexing frequency band in order to detect this uplink message. The center frequency of the detected uplink message is estimated by the access network, and the terminal and the access network then have substantially the same reference frequency, specifically the center frequency of the uplink message, to generate the center frequency of the downlink message. In other words, the terminal and the access network are then substantially frequency-synchronized, this being the case regardless of the precision of the frequency synthesizing means of the terminal, since it is the access network that frequency-synchronizes itself with said terminal, and not the other way round.

Furthermore, since the terminal knows, on the basis of the center frequency of the uplink message that it transmitted itself, how to determine the center frequency on which the downlink message will be transmitted, it is able to listen to the downlink solely around said predetermined center frequency of the downlink message, over a frequency band with a width of the order of the instantaneous spectral width of the downlink message, which width is much smaller than the width of the multiplexing frequency band.

In contrast to the access network, the terminal therefore does not have to listen to the entire multiplexing frequency band. What is more, given that the downlink message is transmitted in response to an uplink message transmitted by the terminal, the latter does not have to listen to the downlink permanently, but only after having transmitted an uplink message.

A problem arises, however, when interference is present in the multiplexing frequency band.

Specifically, if the terminal selects the center frequency of the uplink message without checking the availability of said frequency, this being advantageous for relieving said terminal from having to carry out regular measurements on the uplink, then the uplink message may be missed by the access network. Furthermore, the access network does not transmit a downlink message and the terminal nevertheless listens to the downlink, awaiting a downlink message.

SUMMARY OF THE INVENTION

One aim of the present invention is to mitigate all or some of the limitations of the solutions of the prior art, in particular those outlined above, by proposing a solution that makes it possible to have better protection against interference, while limiting the needs for the terminal to listen to the downlink, awaiting a downlink message.

To this end, and according to a first aspect, the invention relates to a method for the transmission, by a terminal of a wireless communication system, of uplink messages on an uplink to an access network, said method including steps, implemented by said terminal, of:

forming a sequence of $N_R$ uplink messages, each uplink message of the sequence including one and the same useful data packet and control data, said control data including an identifier of the uplink message among the $N_R$ uplink messages of the sequence, transmitting the uplink messages of the sequence on different respective center frequencies, said terminal being configured to receive a downlink message, transmitted in response to the sequence of uplink messages, on a center frequency having predefined respective frequency gaps with respect to the center frequencies of the uplink messages of the sequence.

The uplink messages of the sequence thus all include the same useful data packet. This useful data packet is therefore transmitted $N_R$ times on the uplink. Furthermore, the $N_R$ uplink messages of the sequence are transmitted on different respective center frequencies. Thus, even in the presence of interference in a part of the multiplexing frequency band, the access network is able generally to detect at least one of the $N_R$ uplink messages of the sequence, transmitted on a center frequency that is relatively undisturbed by said interference, and to extract said useful data packet. The probability of missing the useful data packet is therefore reduced by virtue of the frequency diversity introduced by the transmission of said useful data packet in a plurality of uplink messages, on different respective center frequencies.

However, given that the uplink messages of the sequence are transmitted on a plurality of different center frequencies, it is not possible for the access network, without providing other means, to know which center frequency has to be used as reference frequency in order to determine the center frequency on which the downlink message has to be transmitted. This is all the more true as all of the uplink messages of the sequence are not necessarily received by the access network.

To this end, the uplink messages of the sequence include respective identifiers making it possible to distinguish the $N_R$ uplink messages of the sequence from one another. Furthermore, the center frequency of the downlink message has predefined respective frequency gaps with respect to the center frequencies on which the $N_R$ uplink messages of the sequence are transmitted. The center frequencies of the uplink messages of the sequence are not known a priori to the access network; however, the predefined frequency gaps are known a priori to the access network or are able to be determined by said access network. Said predefined frequency gaps are respectively associated with the various identifiers of the $N_R$ uplink messages such that it is possible to find, on the basis of the identifier of an uplink message of the sequence, the frequency gap between the center frequency of this uplink message and the center frequency on which the downlink message has to be transmitted.

When it receives any uplink message of the sequence, the access network is thus able to measure the center frequency thereof, extract the identifier thereof, find the frequency gap associated with said extracted identifier, and estimate, as a function of said frequency gap, the center frequency on which the downlink message has to be transmitted. As a result, the access network is able to estimate, without ambiguity, the center frequency on which the downlink message has to be transmitted, this being the case regardless of the uplink message of the sequence that it has received, including if the uplink messages have been missed, for example on account of interference in the multiplexing frequency band.

In particular modes of implementation, the method for transmission on the uplink may furthermore include one or more of the following features, taken alone or in any of the technically possible combinations.

In particular modes of implementation, the identifiers of the uplink messages of the sequence correspond respectively to different predefined synchronization patterns.

Such provisions are advantageous in that the addition of the identifier to an uplink message of the sequence does not increase the amount of control data included in this uplink message. Specifically, the synchronization pattern, included for synchronizing the access network with said uplink message, is then furthermore used to encode the identifier of the uplink message within the sequence, that is to say to distinguish the $N_R$ uplink messages of the sequence from one another. To achieve this, $N_R$ different synchronization patterns are considered, which synchronization patterns are respectively associated with the various uplink messages of the sequence. The amount of control data of a synchronization pattern is not increased in comparison with the case where a single synchronization pattern is used. By contrast, the access network now has to compare each detected uplink message with a plurality of synchronization patterns in order to simultaneously perform the synchronization and the extraction of the identifier of the detected uplink message.

In particular modes of implementation, the uplink messages of the sequence are transmitted successively without a temporal overlap between them.

According to a second aspect, the present invention relates to a terminal including means that are configured to implement a method for transmission on an uplink according to any one of the modes of implementation of the invention.

According to a third aspect, the present invention relates to a method for the transmission, by an access network of a wireless communication system, of a downlink message on a downlink to a terminal in response to a sequence of uplink messages transmitted by said terminal in accordance with a method for transmission on the uplink according to any one of the modes of implementation of the invention. The method for transmission on the downlink includes a step of searching for uplink messages on the uplink and, when an uplink message is detected, steps of:

measuring the center frequency of the detected uplink message, extracting the identifier of the detected uplink message, estimating the center frequency on which the downlink message has to be transmitted as a function of the measurement of the center frequency and of the extracted identifier of said detected uplink message, transmitting the downlink message on the estimated center frequency.

In particular modes of implementation, the method for transmission on the downlink may furthermore include one or more of the following features, taken alone or in any of the technically possible combinations.

In particular modes of implementation, extracting the identifier of the detected uplink message includes comparing said detected uplink message with various predefined synchronization patterns that are respectively associated with the various identifiers of the uplink messages of the sequence.

In particular modes of implementation, the step of estimating the center frequency of the downlink message includes steps of:

estimating a reference frequency as a function of the measurement of the center frequency of the detected uplink message and of a predefined frequency gap, associated with the extracted identifier, between the reference frequency and the center frequency of the detected uplink message, estimating the center frequency of the downlink message as a function of the estimated reference frequency.

In particular modes of implementation, the center frequency of the downlink message is determined as a function of the predefined frequency gap, associated with the extracted identifier, between the center frequency of the detected uplink message and the center frequency on which the downlink message has to be transmitted.

According to a fourth aspect, the present invention relates to a base station including means that are configured to implement a method for transmission on a downlink according to any one of the modes of implementation of the invention.

According to a fifth aspect, the present invention relates to an access network including means that are configured to implement a method for transmission on a downlink according to any one of the modes of implementation of the invention.

BRIEF DESCRIPTION OF THE DRAWINGS

The invention will be better understood upon reading the following description, given by way of entirely non-limiting example and with reference to the figures, in which.

In these figures, identical references from one figure to another denote identical or analogous elements. For the sake of clarity, the elements shown are not to scale, unless indicated otherwise.

DETAILED DESCRIPTION OF EMBODIMENTS

Figure 1:
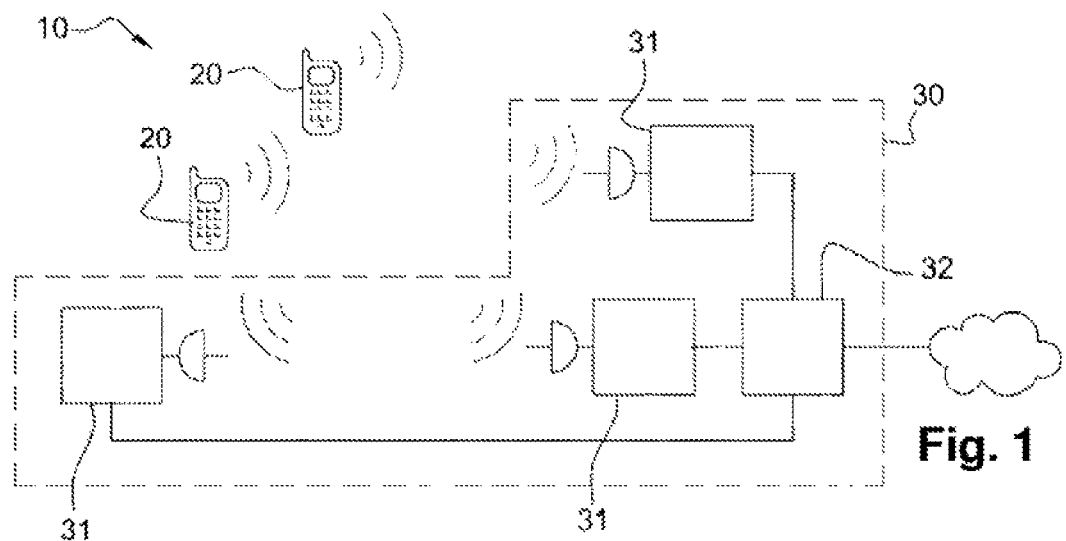
FIG. 1 shows a schematic representation of a wireless communication system.

FIG. 1 schematically shows a wireless communication system 10, for example of the UNB type, including a plurality of terminals 20 and an access network 30 including a plurality of base stations 31.

The terminals 20 and the base stations 31 of the access network 30 exchange data in the form of radio signals. "Radio signal" is understood to mean an electromagnetic wave propagating via non-wired means and whose frequencies are contained within the traditional radio wave spectrum (from a few hertz to several hundred gigahertz).

The terminals 20 are designed to transmit uplink messages on an uplink to the access network 30. The uplink messages are for example transmitted asynchronously. "Transmit asynchronously" is understood to mean that the terminals 20 autonomously determine when they transmit and/or on what center frequency they transmit, without coordinating said terminals 20 with one another and with the base stations 31 of the access network 30.

In the remainder of the description, we consider, in a non-limiting manner, the case where the terminals 20 are at least frequency-asynchronous, such that the uplink messages are transmitted on center frequencies that are not known a priori to the access network 30.

Each base station 31 is designed to receive the uplink messages from the terminals 20 that are located within its range. Each uplink message thus received is for example transmitted to a server 32 of the access network 30, possibly accompanied by other information, such as an identifier of the base station 31 that received it, the measured power of said received uplink message, the date of reception of said uplink message, the measured center frequency of said received uplink message, etc. The server 32 processes for example all of the uplink messages received from the various base stations 31.

The access network 30 is furthermore also designed to transmit, by means of the base stations 31, downlink messages on a downlink to the terminals 20, which terminals are designed to receive them. The downlink messages are for example transmitted on the initiative of the access network 30. In such a case, the terminals 20 have to listen to the downlink permanently, awaiting a possible downlink message.

In the remainder of the following description, we consider, in a non-limiting manner, the case where the access network 30 transmits downlink messages in response to uplink messages transmitted by terminals 20, such that the terminals 20 in principle only have to listen to the downlink, awaiting a downlink message, after having transmitted one or more uplink messages to the access network 30.

A) Method for Transmission on the Uplink

Figure 2:
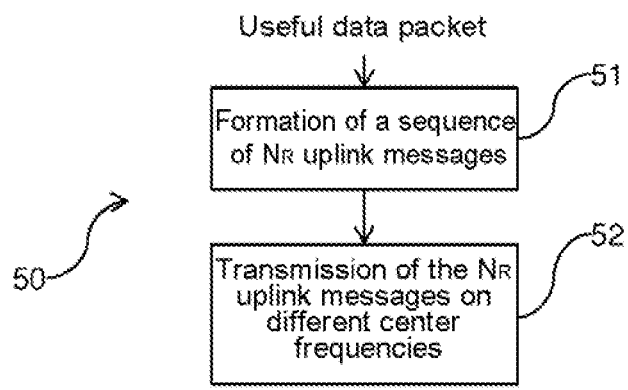
FIG. 2 shows a diagram illustrating the main steps of a method for transmission on an uplink.

FIG. 2 schematically shows the main steps of a method 50 for the transmission, by a terminal 20, of useful data packets on the uplink to the access network 30.

For example, the terminal 20 includes a processing module (not shown in the figures), including one or more processors and storage means (magnetic hard disk, electronic memory, optical disk, etc.) in which is stored a computer program product, in the form of a set of program code instructions to be executed in order to implement the various steps of the method 50 for transmission on the uplink. In one variant, the processing module includes one or more programmable logic circuits, of FGPA, PLD, etc. type, and/or specialized integrated circuits (ASIC) that are designed to implement all or some of said steps of the method 50 for transmission on the uplink. Each terminal 20 furthermore includes wireless communication means, which are considered to be known to those skilled in the art, enabling said terminal to transmit uplink messages and to receive downlink messages in the form of radio signals.

In other words, the terminal 20 includes a set of means that are configured by software (specific computer program product) and/or hardware (FPGA, PLD, ASIC, etc.) in order to implement the various steps of the method 50 for transmission on the uplink.

As illustrated by FIG. 2, the method 50 for transmission on the uplink mainly includes the following steps, which will be described in greater detail below:

51 forming a sequence of $N_R$ uplink messages from one and the same useful data packet, 52 transmitting the uplink messages of the sequence on different respective center frequencies.

It should be noted that the order of the steps illustrated by FIG. 2 is not limiting, with the exception that an uplink message of the sequence, in order to be transmitted effectively, must have been formed beforehand. For example, if the uplink messages of the sequence are transmitted successively, it is possible:

firstly to form the first uplink message of the sequence (step 51) and to transmit it on the uplink (step 52), then to form the second uplink message of the sequence (step 51) and to transmit it on the uplink (step 52), etc.

A.1) Formation of the Sequence of $N_R$ Uplink Messages

During the step 51 of forming the sequence of uplink messages, $N_R$ uplink messages are formed from one and the same useful data packet. In other words, all of the $N_R$ uplink messages of the sequence include the same useful data packet, such that it suffices for one of the uplink messages of the sequence to be received by the access network 30 in order that said data packet be able to be extracted.

The number $N_R$ of uplink messages of the sequence, that is to say the number of replicas of the same useful data packet transmitted on the uplink, is equal to or greater than two. In the remainder of the description, we consider, in a non-limiting manner, the case where the number $N_R$ is equal to three, such that the sequence includes three uplink messages, respectively M1, M2 and M3, including the same useful data packet.

It should be noted that, although the same useful data packet is transmitted in each uplink message of the sequence, different processing operations may be applied, to said useful data packet, from one uplink message of the sequence to another. For example, it is possible to apply, to the useful data packet, a different channel coding from one uplink message of the sequence to another. For example, the same error correction code may be applied to the useful data packet, and the encoded useful data may be punctured so as to obtain one and the same coding rate for all of the uplink messages of the sequence, but taking into consideration a different puncturing pattern from one uplink message to another. For example, in the case where the encoded useful data include the useful data packet and parity bits that are added by the error correction code, the puncturing may concern only the parity bits, such that the transmitted parity bits vary from one uplink message of the sequence to another. Such provisions specifically make it possible, when a plurality of uplink messages of the sequence are received by the access network 30, to improve the robustness of the error correction decoding by making greater use of redundancy.

If the processing operations applied to the useful data packet are able to vary from one uplink message of the sequence to another, the useful data packet must be able to be extracted by the access network 30 from any one of the uplink messages M1, M2, M3 of the sequence.

Each uplink message M1, M2, M3 of the sequence includes, besides said useful data packet, control data. According to the invention, said control data of each uplink message of the sequence include an identifier of the uplink message making it possible to distinguish the $N_R$ uplink messages of the sequence from one another.

For example, the identifier may take the form of a counter of the uplink messages of the sequence, which counter is inserted into the uplink message in addition to the other control data. For example, for the uplink message M1 of the sequence, the inserted counter is equal to 1, for the uplink message M2 of the sequence, the inserted counter is equal to 2, and for the uplink message M3 of the sequence, the inserted counter is equal to 3.

If such a counter is able to be encoded with a small number of additional bits (two bits are sufficient in the case where $N_R$ is equal to three), it is desirable, in particular for low-speed applications such as the majority of M2M or IoT applications, to reduce the amount of control data in the uplink messages as much as possible.

To this end, in preferred modes of implementation, the identifiers of the uplink messages of the sequence correspond to different predefined synchronization patterns.

Specifically, it is known to insert, into an uplink message, a temporal and/or frequency synchronization pattern that is used by the access network 30 to estimate the starting point in time of the uplink message and/or to precisely estimate the center frequency of said uplink message. Advantageously, rather than using the same synchronization pattern for all of the uplink messages of the sequence, $N_R$ different synchronization patterns are considered, which synchronization patterns are respectively associated with the various uplink messages of the sequence. The $N_R$ different synchronization patterns are for example stored in a non-volatile memory of the terminal 20. As a result, for the uplink message M1 of the sequence, the terminal 20 inserts the synchronization pattern of index 1, for the uplink message M2 of the sequence, the terminal 20 inserts the synchronization pattern of index 2, etc.

As the synchronization pattern is different from one uplink message of the sequence to another, the access network 30 is able to distinguish between the $N_R$ uplink messages of the sequence by analyzing the synchronization pattern of each detected uplink message. Given that the synchronization pattern is used both for mutually synchronizing and for distinguishing between the $N_R$ uplink messages of the sequence, the amount of control data that is inserted into each uplink message is not increased in comparison with the case where a single synchronization pattern is used.

A.2) Transmission of the Uplink Messages of the Sequence

During the transmission step 52, the uplink messages M1, M2, M3 of the sequence are transmitted on different respective center frequencies F1, F2 and F3 within a multiplexing frequency band of the various terminals 20.

Furthermore, the terminal 20 is configured to receive a downlink message, transmitted in response to the sequence of $N_R$ uplink messages M1, M2, M3, on a center frequency $F_D$ having predefined respective frequency gaps $\Delta F_D[1]$, $\Delta F_D[2]$, $\Delta F_D[3]$ with respect to the center frequencies F1, F2 and F3. In other words, the center frequency $F_D$ on which the downlink message has to be transmitted, and the center frequencies F1, F2, F3, satisfy the following expressions:

$$F_D = F1 + \Delta F_D[1]$$

$$F_D = F2 + \Delta F_D[2]$$

$$F_D = F3 + \Delta F_D[3]$$

The terminal 20 thus knows a priori on which center frequency $F_D$ it has to receive the downlink message transmitted in response to the sequence of $N_R$ uplink messages M1, M2, M3. On account of the fact that the terminal 20 has to receive, after having transmitted said sequence of $N_R$ uplink messages, one or more downlink messages on only a single center frequency, specifically the center frequency $F_D$, said terminal 20 therefore does not have to listen to the downlink over the entire multiplexing frequency band, but only over a frequency band of small width around said center frequency $F_D$. The width of said frequency band over which the terminal 20 listens to the downlink is for example of the order of the instantaneous spectral width of the downlink message, for example twice as great as said instantaneous spectral width of said downlink message (in order to take account of imprecision in the synthesis of the center frequency, of the frequency drift of the frequency synthesizing means, of a possible Doppler effect, etc.). On account of the fact that the terminal 20 listens to the downlink only over a frequency band of limited width, the complexity of the processing operations associated with searching for the downlink message on the downlink is greatly reduced. Furthermore, the number of downlink messages liable to be detected by said terminal 20, including downlink messages that are not intended addressed to it, is greatly reduced in comparison with the case where the terminal 20 might receive downlink messages on any center frequency of the downlink.

The frequency gaps $\Delta F_D[1]$, $\Delta F_D[2]$, $\Delta F_D[3]$, and the uplink messages M1, M2, M3 of the sequence to which they are applied, are known a priori to the access network 30, or are able to be determined by said access network 30. As a result, given that the access network 30 is able, by virtue of the identifiers, to distinguish the uplink messages M1, M2, M3 of the sequence from one another, the access network 30 is also able to find the predefined frequency gap associated with any detected uplink message of the sequence, and to estimate the center frequency $F_D$ on the basis of a measurement of the center frequency of said detected uplink message.

To generate the center frequencies F1, F2 and F3, the terminal 20 may for example use a reference frequency $F_R$. The reference frequency $F_R$ is for example selected to be within the multiplexing frequency band, preferably in a substantially random manner by means of a pseudo-random generator.

The center frequencies F1, F2 and F3 may be generated by means of predefined respective frequency gaps $\Delta F1$, $\Delta F2$ and $\Delta F3$ with respect to the reference frequency $F_R$. In other words, the center frequencies F1, F2 and F3 and the reference frequency $F_R$ satisfy the following expressions:

$$F1 = F_R + \Delta F1$$

$$F2 = F_R + \Delta F2$$

$$F3 = F_R + \Delta F3$$

For example, the reference frequency $F_R$ may be considered as being the center frequency F1, in which case the frequency gap $\Delta F1$ is zero. The center frequency F2 is then equal to $(F1+\Delta F2)$, and the center frequency F3 is then equal to $(F1+\Delta F3)$. In another example, the reference frequency $F_R$ corresponds to the center frequency $F_D$ on which the downlink message has to be transmitted, in which case:

$$\Delta F1 = -\Delta F_D[1]$$

$$\Delta F2 = -\Delta F_D[2]$$

$$\Delta F3 = -\Delta F_D[3]$$

It should be noted that, although the center frequencies F1, F2 and F3 have predefined respective frequency gaps $\Delta F1$, $\Delta F2$ and $\Delta F3$ with respect to the reference frequency $F_R$, they are not necessarily all generated on the basis of said reference frequency $F_R$. For example, it is possible to generate the center frequency F1 directly on the basis of the reference frequency $F_R$, and then to generate the center frequency F2 on the basis of the center frequency F1 by applying a frequency hop $\Delta F2'$ equal to $(\Delta F2-\Delta F1)$, and then to generate the center frequency F3 on the basis of the center frequency F2 by applying a frequency hop $\Delta F3'$ equal to $(\Delta F3-\Delta F2)$.

For a UNB wireless communication system, it is possible to consider frequency gaps of the order of a few kilohertz (kHz) to several tens of kilohertz. For example, the center frequencies F1, F2 and F3 may be spaced apart by 20 kHz. For example, if it is considered that the frequency gap $\Delta F1$ is zero, it is possible to consider a frequency gap $\Delta F2$ equal to 20 kHz and a frequency gap $\Delta F3$ equal to −20 kHz, or indeed a frequency gap $\Delta F2$ equal to 20 kHz and a frequency gap $\Delta F3$ equal to 40 kHz, etc.

The frequency gaps $\Delta F1$, $\Delta F2$, $\Delta F3$ and the frequency gaps $\Delta F_D[1]$, $\Delta F_D[2]$, $\Delta F_D[3]$ are linked to one another by the following expressions:

$$\Delta F_D[1] = \Delta F_D - \Delta F1$$

$$\Delta F_D[2] = \Delta F_D - \Delta F2$$

$$\Delta F_D[3] = \Delta F_D - \Delta F3$$

in which expressions $\Delta F_D$ corresponds to a predefined frequency gap between the center frequency $F_D$ and the reference frequency $F_R$ ($\Delta F_D = F_D - F_R$).

In preferred modes of implementation, the $N_R$ uplink messages of the sequence are transmitted successively, without a temporal overlap between them. Such provisions also make it possible to reduce the complexity of the processing operations to be performed by the terminal 20 for transmitting the sequence of $N_R$ uplink messages. Specifically, if the $N_R$ uplink messages of the sequence were to be transmitted simultaneously, then the terminal 20 would have to work with a higher sampling frequency in order to generate, in the baseband, uplink messages M1, M2, M3 that are spaced apart in terms of frequency by the frequency gaps $\Delta F2'$ and $\Delta F3'$, and/or the wireless communication means of the terminal 20 would have to have more complex analog transmission channels in order to simultaneously translate the uplink messages M1, M2, M3 on different respective center frequencies.

However, there is nothing to rule out, in other examples, having all or some of the uplink messages of the sequence transmitted with a non-zero temporal overlap, for example transmitted simultaneously.

B) Method for Transmission on the Downlink

Figure 3:
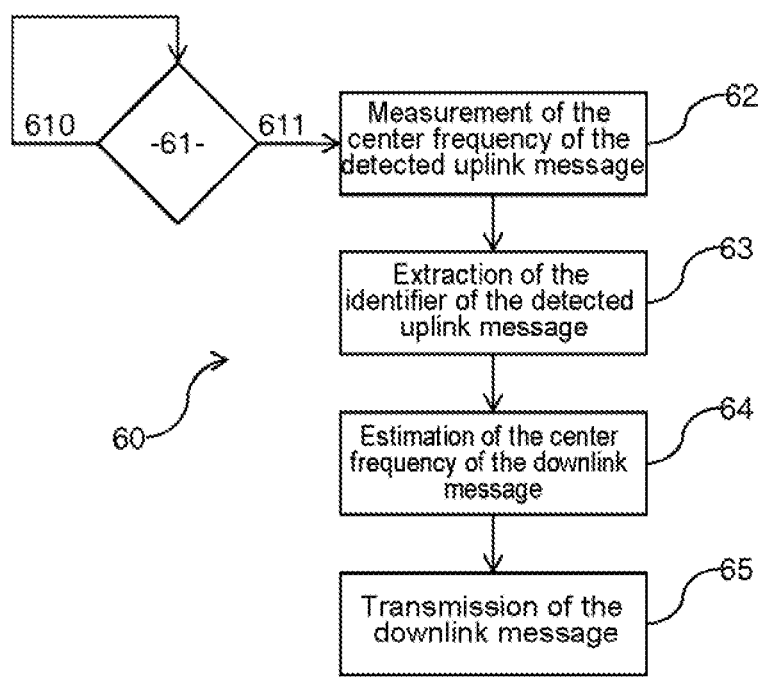
FIG. 3 shows a diagram illustrating the main steps of a method for transmission on a downlink.

FIG. 3 schematically shows the main steps of a method 60 for the transmission, by the access network 30, of a downlink message on the downlink to a terminal 20, in response to a sequence of uplink messages transmitted by said terminal 20 in accordance with a method 50 for transmission on the uplink.

As illustrated by FIG. 3, the method 60 for transmission on the downlink includes, first of all, a step 61 of searching for uplink messages on the uplink. Searching for uplink messages on the uplink is continued for as long as no uplink message has been detected (reference 610 in FIG. 3).

When an uplink message is detected (reference 611 in FIG. 3), the transmission method 60 then includes steps of:
- 62 measuring the center frequency of the detected uplink message,
- 63 extracting the identifier of the detected uplink message,
- 64 estimating the center frequency on which the downlink message has to be transmitted as a function of the measurement of the center frequency and of the extracted identifier of said detected uplink message,
- 65 transmitting the downlink message on the estimated center frequency.

It should be noted that the order of the steps of measuring 62 and extracting the identifier 63 does not matter.

Furthermore, if it is determined that a plurality of detected uplink messages belong to one and the same sequence of uplink messages transmitted by one and the same terminal 20 (for example by using specific control data, such as for example an identifier of the useful data packet transmitted in this sequence, and also an identifier of the terminal 20 that transmitted said sequence of uplink messages), then it is not necessary to execute the steps of the method 60 for transmission on the downlink for each detected uplink message of the sequence. In particular, the center frequency $F_D$ on which the downlink message has to be transmitted is preferably estimated only once. If a single downlink message has to be transmitted in response to the sequence of uplink messages, the transmission step 65 is executed only once. If a plurality of downlink messages have to be transmitted in response to said sequence of uplink messages, they are preferably all transmitted on the same center frequency.

For example, in the case where the uplink messages of the sequence are transmitted successively, without a temporal overlap, it may be advantageous to measure only the center frequency of the last detected uplink message of the sequence, or at least to use only the center frequency measured for said last detected uplink message to estimate the center frequency on which the downlink message has to be transmitted.

Among the various steps illustrated by FIG. 3, only the step 65 of transmitting the downlink message has to be necessarily executed at least partially by a base station 31. The other steps illustrated by FIG. 3 may be executed by a base station 31 and/or by the server 32 of the access network 30. In particular, all of the steps illustrated by FIG. 2 may be executed by the base station 31 that is used to transmit the downlink message on the downlink.

In the remainder of the description, we consider, in a non-limiting manner, the case where the searching step 61 and the measuring step 62 are executed by a base station 31, which then transmits the detected uplink message and the measurement of the center frequency to the server 32. The server 32 then extracts (step 63) the identifier of the detected uplink message, and estimates (step 64) the center frequency on which the downlink message has to be transmitted. The server 32 also forms the downlink message, possibly after having extracted the useful data packet from the detected uplink message, and transmits said downlink message and the estimated center frequency of said downlink message to a base station 31 in whose coverage the terminal 20 is located.

The base stations 31 and the server 32 include, for example, respective processing modules (not shown in the figures), each processing module including, for example, one or more processors and storage means (magnetic hard disk, electronic memory, optical disk, etc.) in which is stored a computer program product, in the form of a set of program code instructions to be executed in order to implement the various steps of the method 60 for transmission on the downlink. In one variant, each processing module includes one or more programmable logic circuits, of FGPA, PLD, etc. type, and/or specialized integrated circuits (ASIC) that are designed to implement all or some of said steps of the method 60 for transmission on the downlink.

Each base station 31 furthermore includes wireless communication means, which are considered to be known to those skilled in the art, enabling said base station to receive uplink messages and to transmit downlink messages in the form of radio signals. The base stations 31 and the server 32 also include respective network communication means, which are considered to be known to those skilled in the art, enabling the server 32 to exchange data with each base station 31.

In other words, the access network 30 includes a set of means that are configured by software (specific computer program product) and/or hardware (FPGA, PLD, ASIC, etc.) in order to implement the various steps of the method 60 for transmission on the downlink.

A description will now be given of non-limiting examples of implementation of the various steps of the method 60 for transmission on the downlink.

B.1) Searching for Uplink Messages and Center Frequency Measurement

The step 61 of searching for uplink messages on the uplink is considered to be known to those skilled in the art, and includes, for example, calculating a frequency spectrum in the multiplexing frequency band, and searching for local maxima in said frequency spectrum that are higher than a predefined detection threshold value.

When an uplink message is detected, the step 62 of measuring the center frequency of the detected uplink message consists, for example, in obtaining the frequency associated with the local maximum of the frequency spectrum that led to the detection of said uplink message.

B.2) Extraction of the Identifier

During the extraction step 63, the identifier of the detected uplink message, which identifier makes it possible to distinguish the $N_R$ uplink messages of the sequence from one another, is extracted from the detected uplink message. The extraction of said identifier depends on the manner in which it has been incorporated into the uplink message, and is considered as being within the scope of those skilled in the art.

In the previously described case where different synchronization patterns are used to distinguish between the $N_R$ uplink messages of the sequence, then extracting the identifier of the detected uplink message includes, for example, comparing said detected uplink message with the various synchronization patterns, which are for example stored beforehand in a non-volatile memory of the access network 30. This comparison aims to measure the similarity between the detected uplink message and each possible synchronization pattern, for example by correlation. The extracted identifier corresponds to the one associated with the synchronization pattern that makes it possible to optimize the similarity with the detected uplink message.

At the end of the extraction step 63, it is therefore known which uplink message among the $N_R$ uplink messages of the sequence has been detected.

B.3) Estimation of the Center Frequency of the Downlink Message

As indicated previously, the $N_R$ uplink messages M1, M2, M3 of the sequence are transmitted on different respective center frequencies F1, F2, F3, and the center frequency $F_D$ on which the downlink message has to be transmitted has predefined respective frequency gaps $\Delta F_D[1]$, $\Delta F_D[2]$, $\Delta F_D[3]$ with respect to said center frequencies F1, F2 and F3.

The frequency gaps $\Delta F_D[1]$, $\Delta F_D[2]$, $\Delta F_D[3]$ are therefore associated in a one-to-one manner with the various uplink messages M1, M2, M3 of the sequence, and are known a priori to the access network 30, or are able to be determined by said access network 30.

To estimate the center frequency $F_D$, the access network 30 may for example store, in a non-volatile memory, the frequency gaps $\Delta F1$, $\Delta F2$ and $\Delta F3$ that are respectively associated with the identifiers of the uplink messages M1, M2, M3, and also the frequency gap $\Delta F_D$. In such a case, the step 64 of estimating the center frequency $F_D$ of the downlink message includes steps (not shown in the figures) of:

estimating the reference frequency $F_R$ as a function of the measurement of the center frequency of the detected uplink message and of the predefined frequency gap, associated with the extracted identifier, between the reference frequency $F_R$ and the center frequency of the detected uplink message, estimating the center frequency $F_D$ of the downlink message as a function of the estimated reference frequency $F_R$ and on the frequency gap $\Delta F_D$.

For example, if the extracted identifier corresponds to the identifier of the uplink message M2 of the sequence, then the access network 30 finds the associated frequency gap $\Delta F2$ and is able to estimate the reference frequency $F_R$ in accordance with the following expression:

$$F'R = F'2 - \Delta F2$$

in which expression:
- $F'_R$ corresponds to the estimation of the reference frequency $F_R$,
- $F'2$ corresponds to the measured value of the center frequency F2 of the uplink message M2 of the sequence.

The center frequency $F_D$ of the downlink message may then be estimated in accordance with the following expression:

$$F'_D = F'_R + \Delta F_D$$

in which expression $F'_D$ corresponds to the estimated value of the center frequency $F_D$ of the downlink message.

In another example, the access network 30 stores, in a non-volatile memory, the frequency gaps $\Delta F_D[1]$, $\Delta F_D[2]$ and $\Delta F_D[3]$ that are respectively associated with the identifiers of the uplink messages M1, M2, M3. In such a case, the center frequency $F_D$ of the downlink message is estimated as a function of the predefined frequency gap, associated with the extracted identifier, between the center frequency of the detected uplink message and the center frequency $F_D$ on which the downlink message has to be transmitted.

For example, if the extracted identifier corresponds to the identifier of the uplink message M3 of the sequence, then the access network 30 finds the frequency gap $\Delta F_D[3]$ and is able to estimate the center frequency $F_D$ of the downlink message in accordance with the following expression:

$$F'_D = F'3 + \Delta F_D[3]$$

in which expression F'3 corresponds to the measured value of the center frequency F3 of the uplink message M3 of the sequence.

B.4) Transmission of the Downlink Message

At the end of the estimation step 64, the access network 30 has an estimation $F'_D$ of the center frequency $F_D$ on which the terminal 20 expects to receive the downlink message. As a result, during step 65, the downlink message is transmitted on the center frequency $F'_D$, by a base station 31 in whose coverage the terminal 20 is located (for example the base station 31 that detected the sequence of uplink messages transmitted by said terminal).

In a more general manner, it should be noted that the modes of implementation and embodiments considered above have been described by way of non-limiting example, and that other variants are consequently able to be envisioned.

In particular, the invention has been described taking into consideration frequency-asynchronous terminals 20. The invention may be applied, however, to any type of terminal 20, provided that the access network 30 estimates the center frequency $F_D$ on which it has to transmit a downlink message on the basis of the measured center frequency of one or more uplink messages received from this terminal 20. For example, the invention may be applied provided that the terminal 20 is not, or is not able to, frequency-synchronize itself with the access network 30 with sufficient precision, and that, as a result, it is the access network 30 that frequency-synchronizes itself with the terminal 20 in order to transmit a downlink message to said terminal 20.

The invention claimed is:

1. A method for transmitting uplink messages on an uplink to an access network, comprising steps implemented by a terminal of a wireless communication system:
   forming a sequence of uplink messages, each uplink message of the sequence comprising one and the same traffic data packet and control data, the control data comprising an identifier of said each uplink message among the uplink messages of the sequence;
   transmitting the uplink messages of the sequence on different respective center frequencies; and
   receiving a downlink message, transmitted in response to the sequence of uplink messages, on a center frequency having predefined respective frequency gaps with respect to the center frequencies of the uplink messages of the sequence.

2. The method as claimed in claim 1, wherein the identifiers of the uplink messages of the sequence correspond respectively to different predefined synchronization patterns.

3. The method as claimed in claim 1, wherein the uplink messages of the sequence are transmitted successively without a temporal overlap between them.

4. The method as claimed in claim 2, wherein the uplink messages of the sequence are transmitted successively without a temporal overlap between them.

5. A terminal comprising a processor and a wireless transmitter/receiver, the terminal configured to implement the method of transmitting on the uplink as claimed in claim 1.

6. A method for transmitting, by an access network of a wireless communication system, a downlink message on a downlink to the terminal in response to the sequence of uplink messages transmitted by the terminal by the method as claimed in claim 1, comprising steps of:
   searching for uplink messages on the uplink in response to a detection of an uplink message;
   measuring a center frequency of the detected uplink message;
   extracting the identifier of the detected uplink message;
   estimating the center frequency on which the downlink message is to be transmitted as a function of the measured center frequency and of the extracted identifier of the detected uplink message; and
   transmitting the downlink message on the estimated center frequency.

7. The method as claimed in claim 6, wherein the step of extracting the identifier of the detected uplink message comprises a step of comparing the detected uplink message with predefined synchronization patterns that are respectively associated with the identifiers of the uplink messages of the sequence.

8. The method as claimed in claim 6, wherein the step of estimating the center frequency of the downlink message comprises steps of:
   estimating a reference frequency as a function of the measurement of the center frequency of the detected uplink message and of a predefined frequency gap between the reference frequency and the center frequency of the detected uplink message, the predefined frequency gap being associated with the extracted identifier; and
   estimating the center frequency of the downlink message as a function of the estimated reference frequency.

9. The method as claimed claim 6, wherein the center frequency of the downlink message is determined as a function of a predefined frequency gap between the center frequency of the detected uplink message and the center frequency on which the downlink message is to be transmitted, the predefined frequency gap being associated with the extracted identifier.

10. A base station comprising a processor and a wireless transmitter/receiver, the base station configured to implement the method of transmitting on the downlink as claimed in claim 6.

11. An access network comprising a plurality of processor based base stations and a processor based server configured to implement the method of transmitting on the downlink as claimed in claim 6.

* * * * *